United States Patent [19]
Bernhardt et al.

[11] Patent Number: 5,115,263
[45] Date of Patent: May 19, 1992

[54] PROTECTIVE CASING FOR OPTICAL INSTRUMENTS

[75] Inventors: Rainer Bernhardt, Rosbach; Reiner Waldschmitt, Eschborn, both of Fed. Rep. of Germany

[73] Assignee: Videor Technical E. Hartig GmbH, Rödermark, Fed. Rep. of Germany

[21] Appl. No.: 669,668

[22] Filed: Mar. 14, 1991

[30] Foreign Application Priority Data

Mar. 15, 1990 [DE] Fed. Rep. of Germany ....... 4008338

[51] Int. Cl.$^5$ .............................................. G03B 29/00
[52] U.S. Cl. ...................................... 354/81; 358/108
[58] Field of Search .......................... 354/81, 288, 293; 358/108, 109; 352/243

[56] References Cited

U.S. PATENT DOCUMENTS 4,160,999  7/1979  Clagget ................................ 358/108
4,736,218  4/1988  Kutman ................................ 354/81

Primary Examiner—L. T. Hix
Assistant Examiner—David M. Gray
Attorney, Agent, or Firm—Felfe & Lynch

[57] ABSTRACT

A protective casing (1) for optical instruments, particularly for video cameras, having a tubular casing shell (2) with a sealed front wall (3) added to the respective end, a backwall (4), an instrument support (11) placed within the casing shell and rigidly connected to the backwall, and a casing support (9) placed outside the casing shell for the attachment of the protective casing (1) on a stationary support (12). The electrical connections pass through the backwall (4), and the casing shell can be removed from the backwall of the instrument support (11). In order to facilitate the assembly, the instrument support (11) has a U-shaped section forming a trough open on the top with two parallel side walls and a crossbar connecting both sidewalls, and the inner side of the side walls are equipped with several grooves located parallel to the casing axis in order to allow the insertion of at least one instrument support plate at adjustable heights.

16 Claims, 9 Drawing Sheets

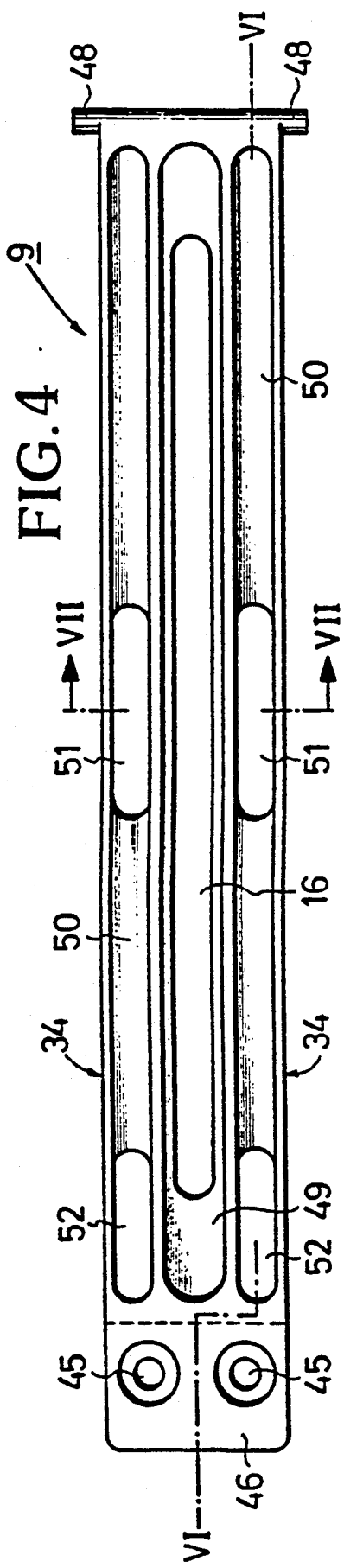
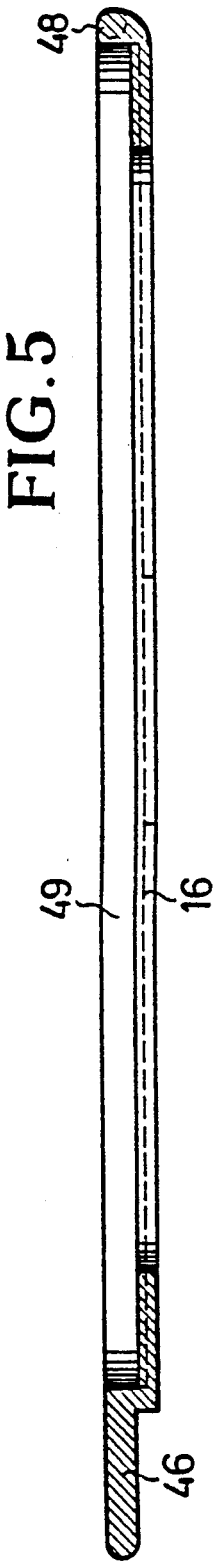
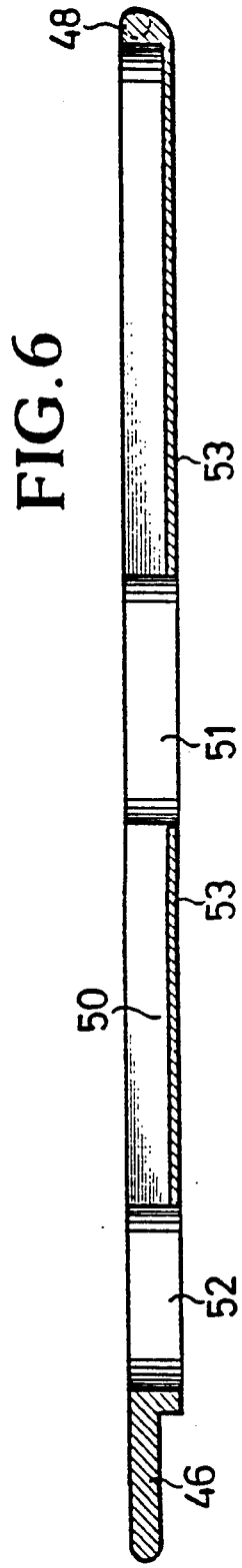

PROTECTIVE CASING FOR OPTICAL INSTRUMENTS

BACKGROUND OF THE INVENTION

The invention concerns a protective casing for optical instruments, in particular a weatherproof protective casing for surveillance systems with video cameras, which has a tubular casing shell with a sealed front wall on one end and backwall on the other end. An instrument support is located within the casing shell rigidly connected to the backwall, and a casing support is located outside the casing shell on its bottom surface, for the attachment of the protective casing in a stationary location. The electrical connections pass through the backwall, and the casing shell can be removed from the backwall and the instrument support.

Such a protective casing is known to the applicant through the trade print script "VIDEO-Security", Edition 3/89, pages 8/9. Protective casings of this type are equipped with the appropriate optical instruments and the corresponding electrical equipment once they have been installed in place by means of a wall bracket, a ceiling hanging or similar attachment. For the purpose of servicing the unit or when repairs have to be carried out, the built-in instruments may have to be disassembled at times. Also changing the optical instruments at a later date are in no way an exception. Since this type of protective casings is preferably used for built-in video cameras, the problems will be explained using a video camera.

When assembled, the casing support, which has the shape of a rail or a sliding carriage, rests on a stationary link head, herein called support. The casing support can be slid in longitudinal direction on this support, and tilted around a horizontal axis, locking in the chosen position.

In the above described known solution the casing backwall is connected to the casing support over a horizontal link axis, and can be tilted, and the instrument support is rigidly connected to this casing backwall. When assembled, the instrument and the casing supports have their longest axes parallel to each other, and the space in-between is occupied by the bottom part of the casing shell, which in order to fulfill its purpose has the shape of a closed tube.

The casing shell can have any cross-sectional form such as square, rectangular, octagonal or round.

For the purpose of disassembly, the casing shell can be slid forward through the gap between the instrument and the casing support, until it reaches a tilt bearing stop. At this point the casing shell remains hanging down in a sloping position due to the effect of gravity. In this position a pendulum movement is possible. Now the instrument support can be tilted up around the back link axis which connects the backwall with the casing support, forming a "V" between the instrument support and the casing support, which however is not stable. The installer now must screw in the camera from the bottom through the instrument support. This is a very difficult, procedure because the individual parts are movable, and the axis of the video camera must coincide exactly with the future position of the casing axis, and must be secured in this position in order to prevent any twisting. In addition, the electrical and electronic parts must be attached to the instrument support and/or the backwall, and finally it must all be wired and connected to the exterior cables. One person can only carry out these procedures with great difficulty.

This is compounded by yet another problem. Video cameras as well as the corresponding lenses come in different shapes and sizes. Lenses can have very different diameters depending on the speed, focal distance and construction. Particularly high speed wide angle lenses have a large diameter, exceeding the measurements of modern video cameras. High speed is required since this type of camera must also be completely functional in poor lighting conditions.

In order to avoid vignetting in this situation, the optical axis of the lens must be as close as possible in the middle of the casing window, provided, of course, the window is large enough. For the above mentioned reasons it is necessary to install the camera on the instrument support at a determined height, which can vary according to the type of camera or lens chosen. In the past this problem was solved by installing inserts between the camera and the instrument support, but also in this case it had to be secured against twisting and turning. This requirement made the assembly of a video camera difficult and time consuming.

A protective casing is known through DE-GM 86 00 747, in which by means of a pair of lateral grooves an instrument support can be introduced into the hollow space at a single height level. In order to level the different distances between the bottom of the camera and the instrument support, spacers of different thickness must be used, in order to allow the installation of different camera and lens types in the casing at a determined height of the camera axis.

The casing support is made-up of an integral piece consisting of a casing floor with grooves and ribs. A relatively short coupling engages with the grooves, connecting the casing with the tilt bearing. The instrument support and the coupling are not connected through the backwall of the casing, and must be assembled separately. In particular, it is not possible to remove the casing shell from the backwall while the camera remains connected to the backwall, and the latter remains connected to a support or a supporting bracket.

SUMMARY OF THE INVENTION

The aim of the invention is to provide a protective casing of the above mentioned type, in which the assembly and adjustment of the optical instruments is considerably simplified even when the instruments have different dimensions, a safe installation is possible even in difficult positions, and the optical axis of the instrument can be aligned and secured with accuracy in relation to the casing axis.

According to the invention, the above described protective casing solves these problems, because the cross-section of the instrument support is U-shaped, forming a trough open on the top with two parallel side walls and a link connecting the side walls, and the sidewalls have several grooves parallel to the casing axis on its interior surfaces, which allow the insertion of a supporting plate for the instrument at adjustable heights.

In this case it is an important prerequisite that the instrument support be connected to the backwall. When in addition to this, the backwall is fixed in relation to the stationary support, so that the instrument support is also immovable, the installer can install the optical instrument, preventing uncontrolled movements of the latter.

Due to the construction of the instrument support in accordance with the invention, the optical instrument already installed on the instrument support plate can be introduced through the front into the instrument support at a height, at which the optical axis of the instrument already coincides to a large extent with the optical axis of the casing. This also allows to secure the instrument safely in order to avoid its twisting and turning on the support plate. This makes it unnecessary to carry many different spacers in order to adjust the height of the optical instrument on the instrument support.

In the simplest case the instrument support plate can be built in the shape of a flat plate with plane parallel surfaces. However, in order to increase even more the range of height adjustment, the instrument support plate can be built, to great advantage, with two edged parallel side walls in its middle portion, and on the free longitudinal edges of the side walls two opposite tracks, pointing outside, which can be inserted into the grooves of the instrument support located on the opposite side.

The use of instrument supports with grooves at different heights is particularly advantageous in the case when the instrument support and the casing support are rigidly connected through the back wall: the safe placing of the optical instrument in the casing can be accomplished by inserting the support plate with the pre-assembled instrument into the corresponding grooves.

A further construction of the guiding elements between the casing shell and the casing support allows pulling out the casing shell together with the connected front wall in a straight line over a swing free track.

Another construction of the casing support allows the installation of the cables connected to the parts inside the protective casing, on the bottom of the casing and completely out of sight, which not only prevents sabotage but also improves its appearance considerably.

Again it is particularly advantageous if the back wall has a hollow space on the side facing the casing shell, built as an extension of the hollow space of the casing shell, with grooves and ribs on its lateral boundary walls, aligned with the grooves and ribs of the instrument support.

This way it is possible for instance to install a second instrument support plate in the casing, pushing it into the hollow space of the back wall in order to install on the same, for instance, power packs and operating mechanisms.

DETAILED DESCRIPTION OF THE PREFERRED EMBODIMENTS

Figure 1:
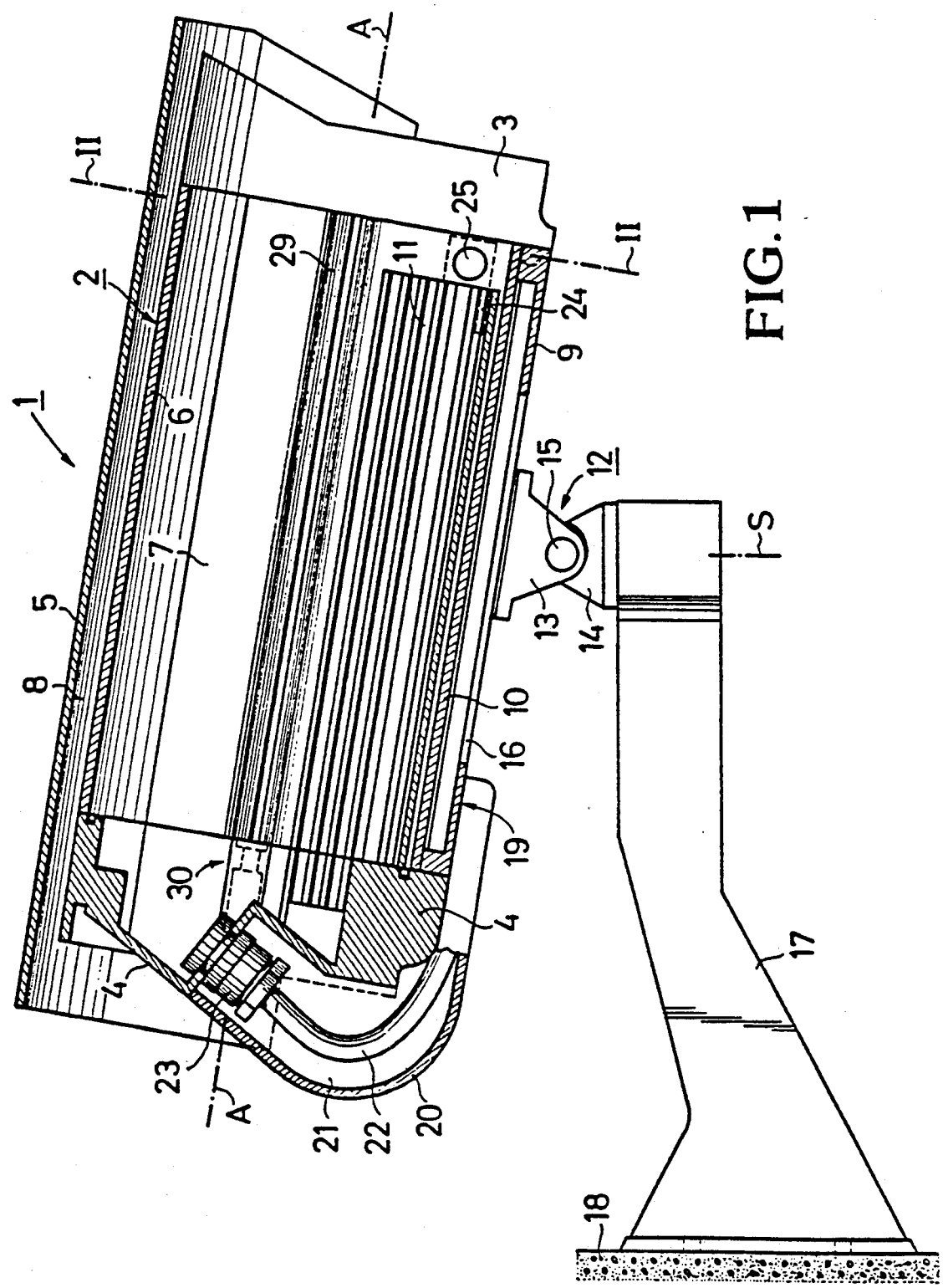
FIG. 1 a vertical axial cross section through a protective casing attached to a wall bracket, FIG. 2 A crosscut along the II—II radial plane in FIG. 1, FIG. 3 a segment of FIG. 2, FIG. a plan view of the casing support, FIG. 5 a longitudinal cut through the object in FIG. 4 along the central axis, FIG. 6 a longitudinal cut through the object in FIG. 4 along the VI—VI line, FIG. 7 a crosscut through the object of FIG. 4 along the VII—VII line, FIG. 8 a vertical axial cross section through the back wall of the casing, FIG. 9 a plan view of the object in FIG. 8, FIG. 10 a plan view of the inner side of the back wall according to FIG. 8, FIG. 11 a plan view of the back side of the back wall according to FIG. 8, FIG. 12 a plan view of a flat instrument support plate, FIG. 13 a crosscut of an edged instrument support plate, FIG. 14 a vertical axial cross section through a protective casing similar to FIG. 1 at enlarged scale and with further details, FIG. 15 a plan view of the inner side of the front wall of the casing, FIG. 16 a plan view of the inner side of a modified back wall similar to FIG. 10, and FIG. 17 a vertical axial cross section similar to FIG. 8 but through the object in FIG. 16.

FIG. 1 shows a weatherproof protective casing for video cameras with a tubular casing shell 2, consisting of a section of light metal extrusion closed in its circumference. The crosscut is shown in FIG. 2, and will be explained in more detail later.

The casing shell 2 is hermetically sealed in the front and the back by means of a front wall 3 and a backwall 4. The protective casing also has a protective roof 5, which surrounds the casing shell 2 on its upper side 6 and most of both side walls 7, leaving an air gap 8. The length of the protective roof 5 is such, that it overhangs the front of the front wall 3, and the back of the backwall 4.

The protective casing also includes a casing support 9, which shall be explained in more detail in FIGS. 2 and 4 to 7.

Figure 2:
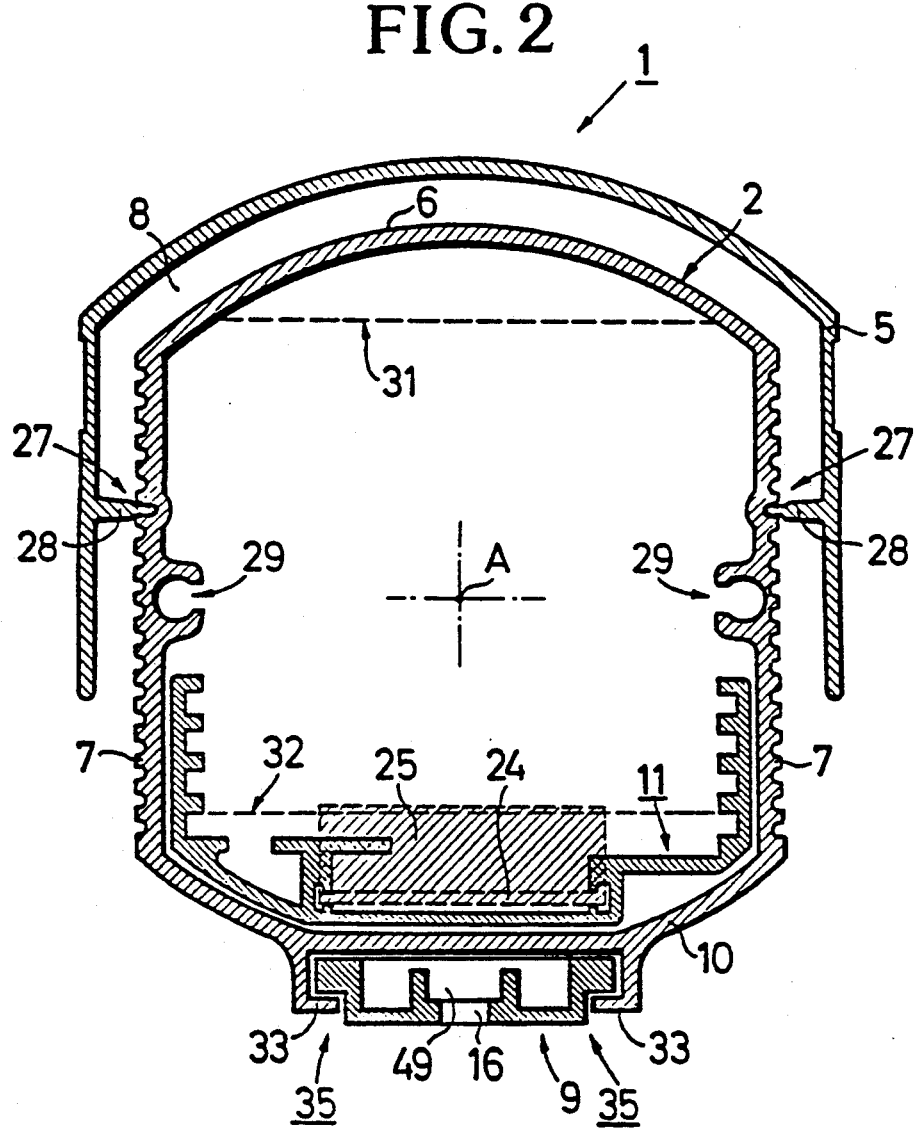

This casing support 9, shown in FIG. 2, is rigidly connected to the back wall 4. The casing support 9 is located just underneath the bottom 10 of the casing shell 2. Above the bottom is an instrument support 11, which is also rigidly connected to the back wall 4, and is also shown in FIG. 2. More details are explained in FIG. 3.

FIGS. 1 and 2 show a gap between the casing support 9 and the instrument support 11, in which is located—with clearance—the bottom 10 of the casing shell 2. Due to the rigid connection of the casing support 9 and the instrument support 11 with the back wall 4, the gap has always the same dimensions, and the casing shell 2 can be removed from it, by sliding it out until it catches one of the so called stop elements, which will be explained in more detail in connection with FIG. 4.

According to FIG. 1 the protective casing 1 is attached to a support 12, consisting of two base supports 13 and 14, connected to each other by a pivot pin 15. The casing support 9 has a longitudinal slot 16 in its center, which allows it to slide on the base support 13 in the direction of the casing axis A—A. The unit is secured with tightening screws (not shown) in such manner, that the pivot pin 15 is located as closely as possible under the center of gravity of the completely equipped protective casing.

The lower base support 14 can be pivoted around a vertical swivel axis S and attached to a wall bracket 17 which is screwed to the wall 18.

The required electric cables pass through the wall bracket 17 as well as through the hollow spaces in the base supports 13 and 14 (not shown in detail), and in a manner described below also inside the casing support 9. The front part of a cover 20 is placed on the back end of the bottom 19 of the casing support 9, which is V-shaped in the vertical sectional plane according to FIG. 1, but is well rounded on its top. This cover 20 extends on its other side to the back wall 4, enclosing a cable conduit 21 in which are located the necessary electric connecting wires, here shown with a multiple cable 22. This multiple cable 22 passes through the backwall 4 by means of a stuffing-box union 23. The lateral closing of the cable conduit 21 is formed, because the cover 20 is U-shaped in all sectional planes running vertically to the sectional plane in accordance with FIG. 1, and abuts without leaving a gap with the backwall 4. In this fashion the multiple cable 22, of which only part is shown, is protected in its entire length against acts of sabotage or exposure. In order to simplify, the further course of this multiple cable inside the protective casing is not shown.

The tilting axis or pivot pin 15 and the swivel axis S form a universal coupling, which allows the adjustment to the casing axis A—A, and with it the axis of the built-in optical instrument at almost any angle towards the object to be monitored.

A heating element 25 is installed in the free front end of the instrument support 11 by means of a support plate 24. This heating element serves for the heating of the casing window 26, shown in FIGS. 14 and 15.

According to FIG. 2 the outside surfaces of the side walls 7 have ribs—not described in more detail—in addition to two particularly defined grooves 27, located exactly opposite, in which additional ribs 28, located in the inner side of the protective roof, can be inserted.

The two side walls 7 have so called screw canals 29 on the inside surfaces, which allows it to fasten the front wall 3 and the backwall 4. The type of attachment is indicated in FIG. 1 under number 30.

In FIG. 2 the dotted lines 31 and 32 indicate the section in which the optical instrument could be located. In this case the optical axis should coincide as closely as possible with the casing axis A.

FIG. 2 also shows that the casing shell 2 has two L-shaped longitudinal ribs 33 on its bottom side 10, whose free sides are one on top of the other, embracing the casing support 9 on its long parallel side edges 34 (FIG. 4), forming dovetail guides 35.

Figure 3:
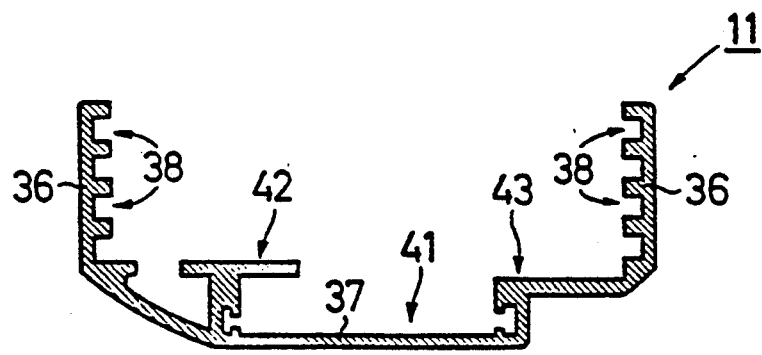
Figure 8:
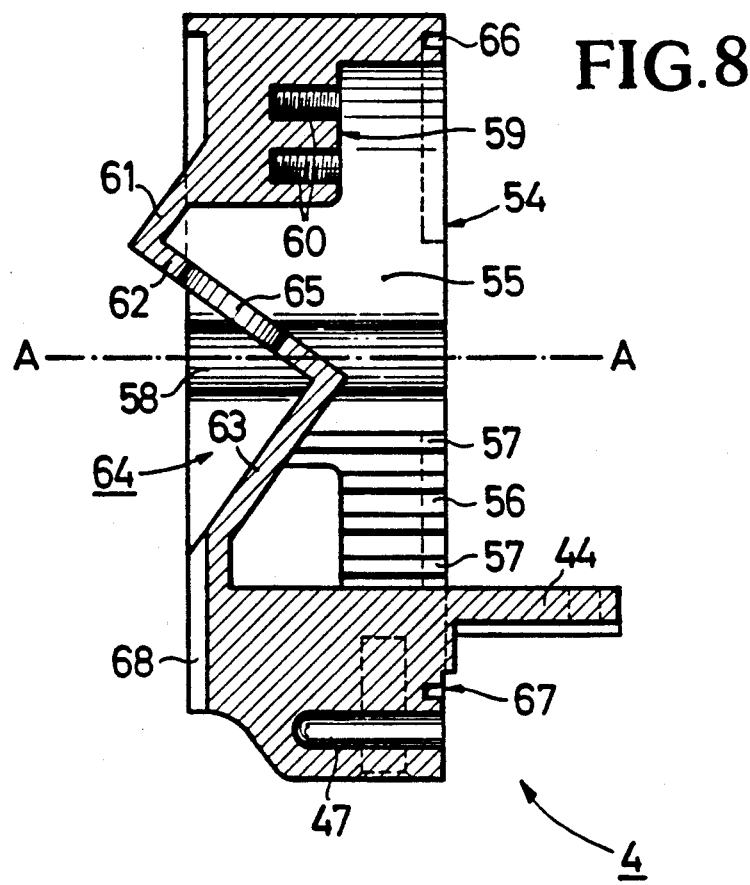
Figure 9:
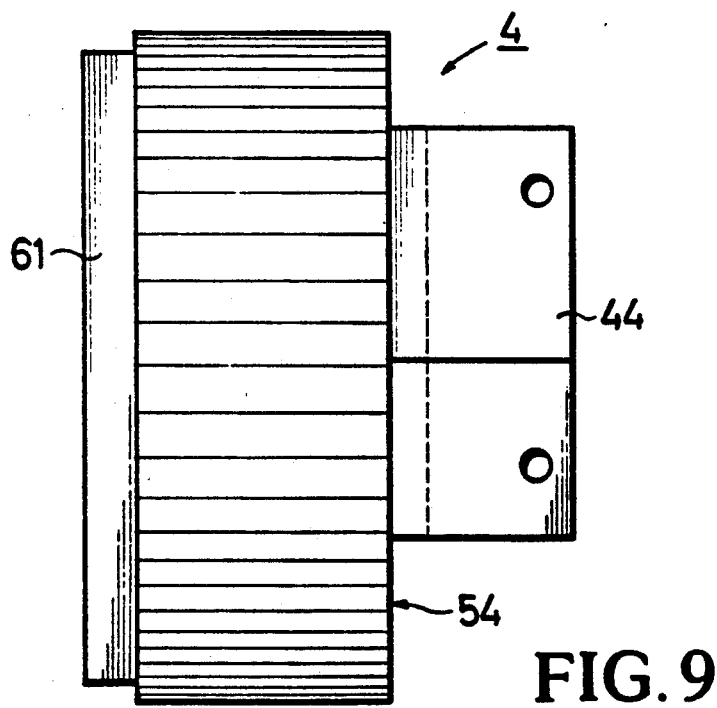
Figure 10:
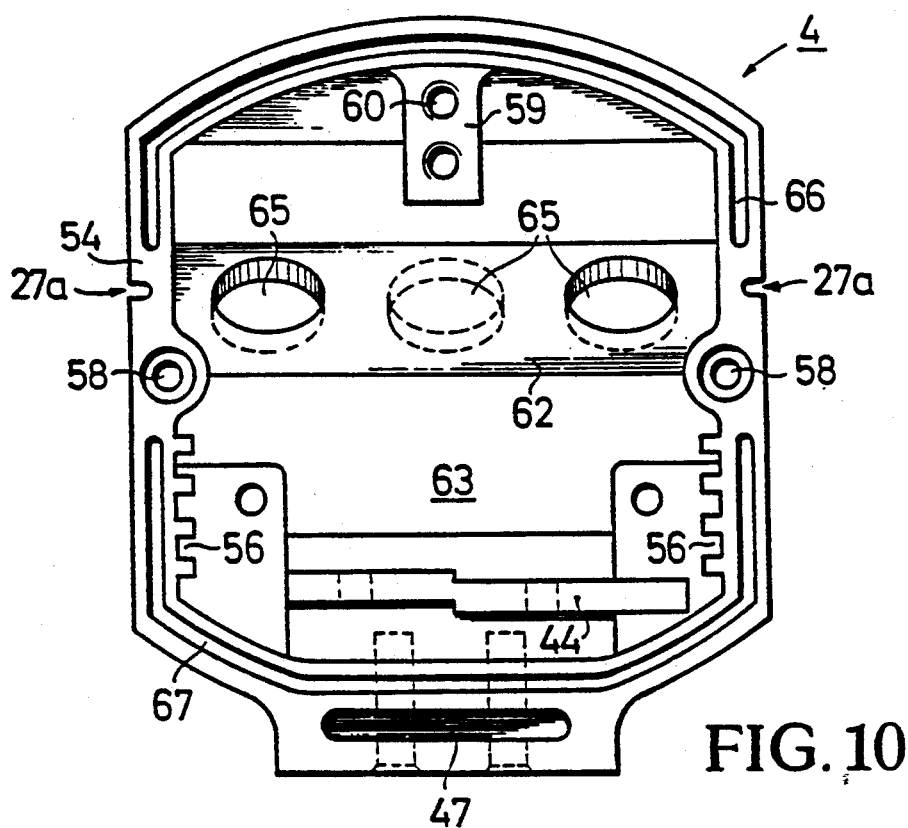

The instrument support 11 also consists of a segment of an extruded light metal section, having a crosscut in the shape of a "U" open on the top with two parallel side walls 36, connected on their lower edges by a crossbar 37. The side walls 36 have several grooves 38 on their inner surfaces, for the insertion of at least one instrument support plate 39 or 40, as shown for instance in FIGS. 12 and 13. FIG. 3 also shows that the instrument support 11 has a slide-in guide open on the top in the area of the crossbar 37, which serves for the pressure locking insertion of the support plate 24 of the heater 25, as represented diagrammatically in FIGS. 1 and 2. In addition the crossbar 37 has two bearing surfaces 42 and 43, to which the instrument support 11 is screwed on with an extension 44 of the back wall 4 which is shaped accordingly (FIGS. 8, 9 and 10).

Figure 7:
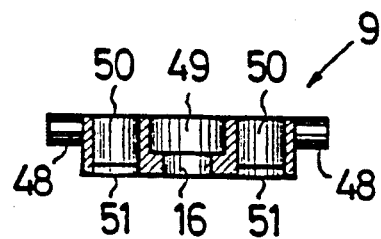

In accordance with FIGS. 4 to 7 the casing support 9 is a light alloy casting. Seen in plan it is essentially elongated and rectangular and has the shape of a rail, whose end section is represented in FIG. 7. The instrument support 11 has bores 45 in its back end, located in an extension 46, in which the instrument support 11 can be inserted in a complementary recess 47 in the inside of the back wall 4, and screwed in rigidly. On the opposite, free end the instrument support 11 has stop elements 48, in the shape of coaxial dowel pins which act together with complementary stop elements located in the back end of the guides 35 in the casing shell 2, in such fashion that the casing shell catches the stop elements at the end of its pull-out route, allowing it to swivel down around the stop elements 48. It should be noted that the sectional plane II—II according to FIGS. 1 and 2 runs through precisely these dowel pin shaped stop elements. For reasons of simplicity, the complementary stop elements of the casing shell are not shown. They could consist of screws or pins protruding from the grooves surrounded by the L-shaped longitudinal ribs.

As can be seen in FIGS. 4 and 5, the casing support 9 has a longitudinal slot 16, already described in more detail in FIG. 1, in the area of its central longitudinal axis, which has a T-shaped widening 49 near the top, serving as a twist resistant guide for a screw head or a nut. On each side of this longitudinal slot is a longitudinal conduit 50 which houses the already described multiple cable 22, and if necessary another multiple cable. The longitudinal conduits 50 each have two openings 51 and 52 pointing down which serve to introduce the already described multiple cable 22. Both openings 51 are located in the area of the base support 13, while both openings 52 are located in the back of the casing support 9 in which the latter is covered by the end of the cover 20. In all other areas the lower part of the longitudinal conduits 50 are enclosed by floor elements 53.

The backwall 4 shown in FIGS. 8 to 11 consists of a casting, and has fastening elements for the instrument support 11 and for the casing support 9 on its front end 54 facing the casing shell 2, i.e. the already described extension 44 as well as the already described recess 47. It can be seen that the main expansion direction of both fastening elements runs parallel to each other.

The backwall 4 has a hollow space 55 on its side facing the casing shell 2, which is formed like an extension of the hollow space of the casing shell 2, and which has grooves 56 and ribs 57 on its lateral boundary walls, which align with the grooves 38 and the intermediary ribs of the instrument support 11. In addition the backwall 4 has screw canals 58 which are in alignment with the screw canals 29 in the casing shell 2. A screw surface 59 with tapholes 60 serves for the fastening of electronic parts, such as a power pack.

The backwall 4 has an enclosing wall 61 on the end facing away from the casing shell 2, which has an angled V-shape in relation to the vertical sectional plane shown in FIG. 8, and where the "V" has an aperture angle of 90 degrees, and the arms 62 and 63 run in an acute angle in relation to the casing axis A—A.

This results in a prism-shaped recess 64 in the backwall 4, and the wall element which forms the upper side 62 of the "V" has openings 65, the middle one of which is shown in profile in FIG. 8. These openings are for the insertion of electrical connecting elements such as the stuffing-box 23 union shown in FIGS. 1 and 14.

Figure 11:
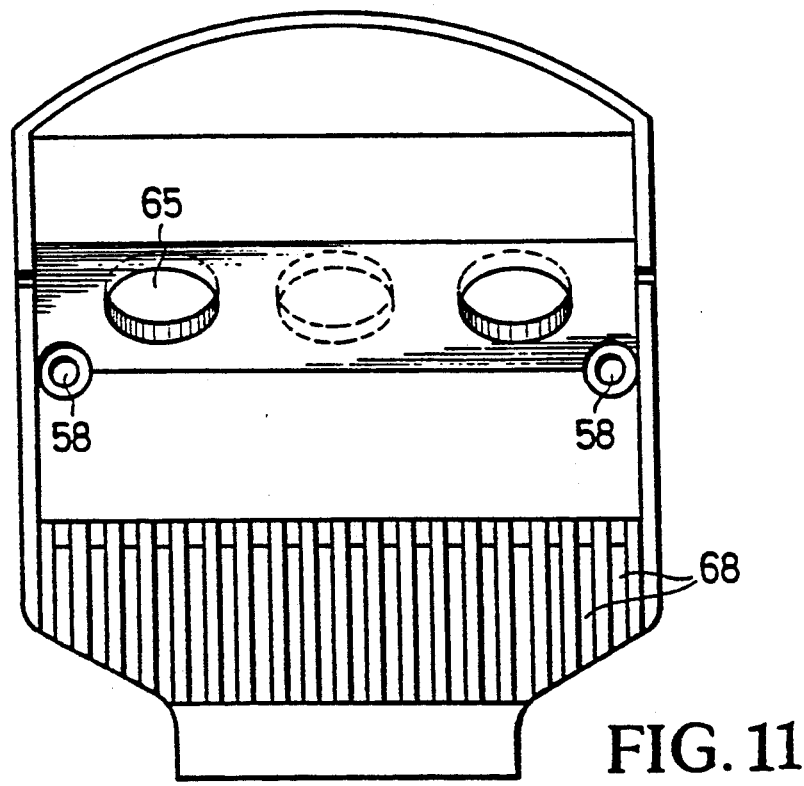

FIGS. 10 and 11 show that the outline of the backwall 4, seen in axial projection direction, coincides to a large extent with the outline of the casing shell, so that the outside surfaces do not show cracks or gradations. The surface of the front side 54 shows segments 66 and 67 of a parallel walled groove, running near the outside edge, which serves for the insertion of a gasket ring, and which is designed as a "T"-shaped part on the largest area of the surface. The bar of this "T" is only missing in those places where the grooves 27a, used to fasten the protective roof 5 and the screw canals 58, are located. In order to simplify, the gasket ring is not shown. FIGS. 8 and 11 also show that the lower part of the backwall 4 has vertical ribs 68.

Figure 12:
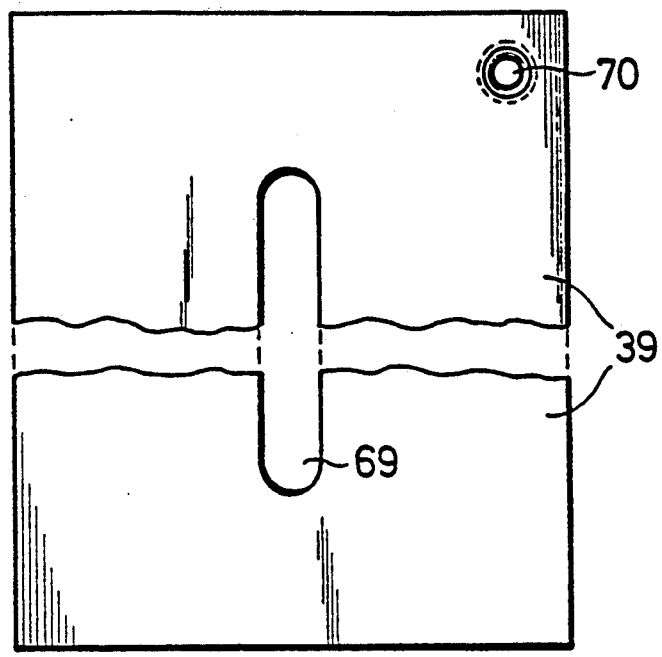

FIG. 12 shows an instrument support plate 39, built in the shape of a plane parallel plate which has a slot 69 along its longest central axis.

The slot is for the insertion of a fastening screw for the optical instrument. The support plate has a lock 70 to prevent torsion.

Figure 13:
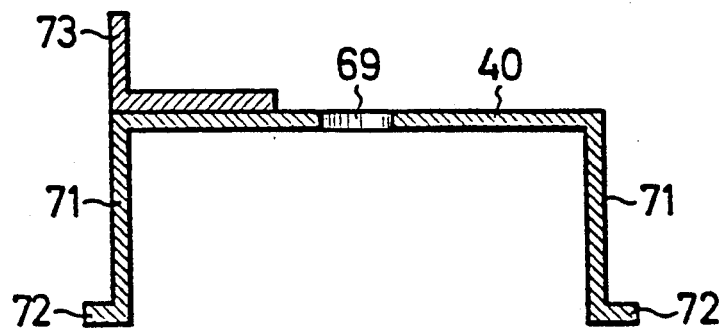

FIG. 13 shows a similar instrument support plate 40 in crosscut. This plate has a cropped shape with two parallel side walls 71, and has two guide ribs 72 facing out in opposite direction, on the free longitudinal edges of these sidewalls, which can be inserted in the opposite grooves of the instrument support 11. Also this support plate has a slot 69 similar to that shown in FIG. 12. The stop to prevent torsion 73 in this case is in the shape of a stop bracket.

Figure 14:
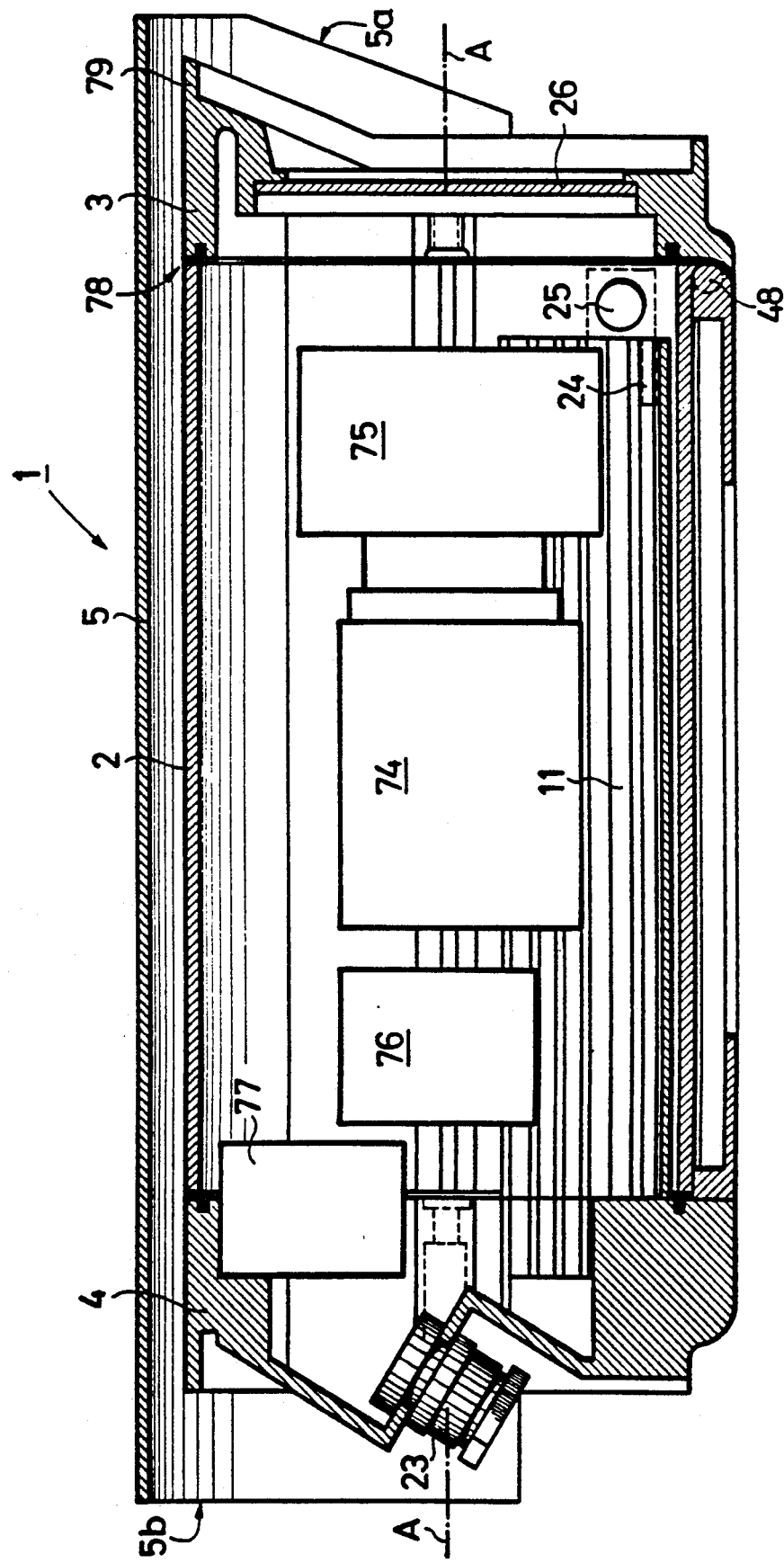
Figure 15:
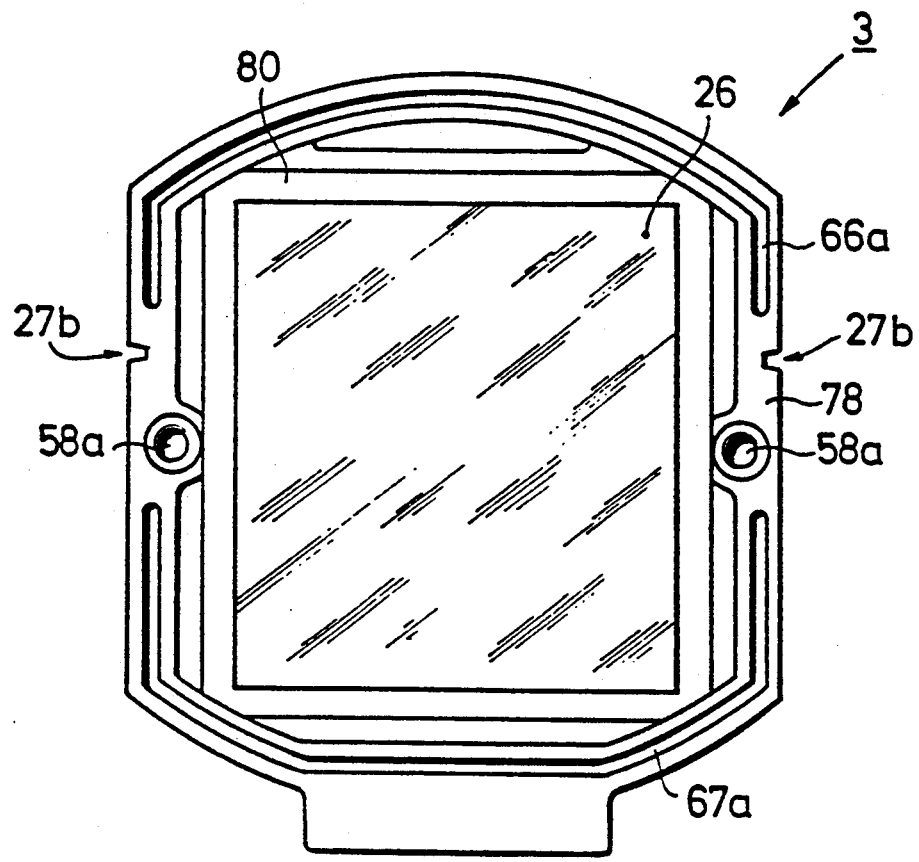

FIG. 14 coincides to a large extent with the upper portion of FIG. 1, however, the equipment that could be placed in the inner space of the protective casing 1 is indicated with a thick line. One instrument support plate placed in the instrument support 11 for instance supports a video camera 74 with a wide-angle lens 75. Another instrument support plate, inserted at a higher "level" in the instrument support 11, for instance, supports a power pack 76. Another power pack 77 is attached to the screw surface 59 of the backwall 4. It can be seen that the optical axis of the video camera 74 and of the lens 75 coincide with the central axis A—A of the protective casing.

FIG. 14 also shows an aperture cut through the front wall 3 in which the already described casing window 26 is located. In its upper area the front wall 3 has an extension 79 protruding towards the front which serves, among others, as a shutter. The course is geometrically similar to that of the front edge 5a of the protective roof 5.

The front wall 3 also has a flat rear end 78, whose shape coincides to a large extent with that of the front end 54 of the backwall 4. The details can be seen in FIG. 15 which shows a topview of the inner side of the front wall 3. Also in this case, located near the outside edge of the front side 78 are segments 66a and 67a of a groove which is almost closed on the circumference, and which serves for the insertion of an elastomeric gasket ring. Also in this case the gasket ring has a bar which is only interrupted in the area of the grooves 27b used to insert the protective roof 5 as well as in the area of the screw canals 58a. The casing window 26 is located in a frame 80 which forms one piece with the front wall 3.

Figure 16:
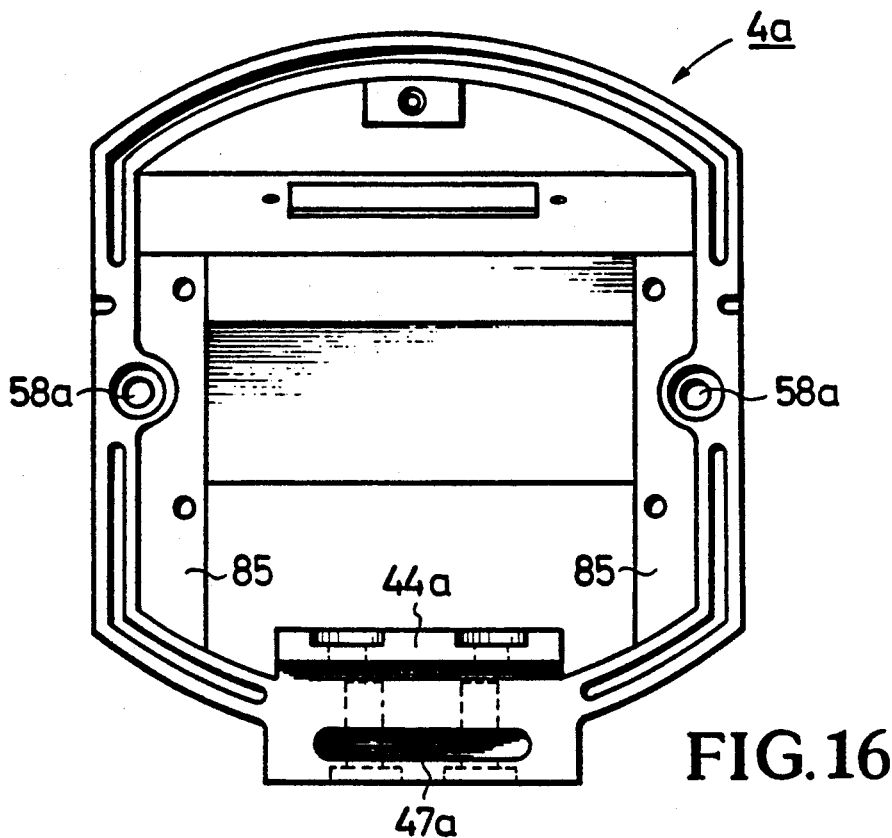
Figure 17:
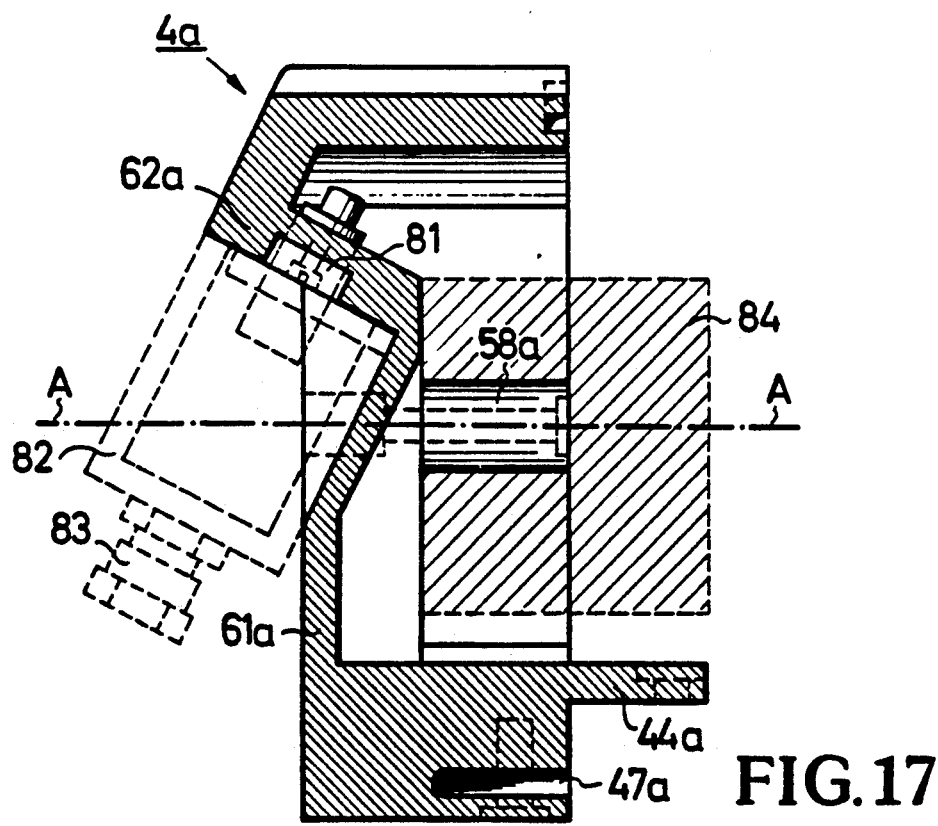

FIGS. 16 and 17 show a variation of the backwall 4a, which in relation to its companion dimensions coincides with those of the backwall 4 according to FIGS. 8 to 11, therefore we will not repeat them. An extension 44a for the rigid attachment of the instrument support 11 and a recess 47a for the insertion of the casing support 9 are present in similar fashion. In the present case, however, the upper side 62a of the enclosing wall 61a has a plug board 81, which works together with a plug attachment 82, which in turn has a stuffing box union 83. This creates a detachable connection which, however, in a similar way as the object shown in FIG. 1, is covered towards the outside by a cover not shown here. Also in this case there are similar screw canals 58a. The screw surfaces 85 according to FIG. 16 serve for the fastening of the power pack 84, which is only indicated here.

The overall view, particularly of FIGS. 1 and 14 allow us to see that the instrument support plate with the already mounted optical and electrical instruments can be placed easily at the desired height, by inserting it through the front into the instrument support 11, once the casing shell 2 has been separated from the backwall 4 and has been drawn-out in the direction of the axis A—A through the parallel walled slit between the instrument support 11 and the casing support 9. Then the casing shell is tilted down together with the front wall 3 around the stop elements 48, where it remains hanging. For practical reasons the protective roof 5 can be removed or pulled away from the casing shell 2 until the trailing edge 5b of the protective roof 5 is out of the way and does not disturb during the assembly. Since in this case the rigid installation of the backwall 4, the casing support 9 and the instrument support 11 are firmly kept in place by the support 12, one person can install the equipment and carry out the wiring safely and without difficulties.

It is understood that in case of very heavy lenses, the lens could have its own instrument support plate, which could be mounted at a different height. The length of the instrument support and the casing support should essentially correspond to the length of the casing shell.

We claim:

1. Protective casing for optical instruments comprising a base, a casing support mounted on said base, a back wall fixed to said casing support and having aperture means for receiving electrical cable means therethrough, a tubular casing shell having a longitudinal axis, a front end, a rear end, and a bottom extending between said ends, said bottom being received on said casing support, said rear end being detachably connected to said back wall, an instrument support inside said casing shell and fixed to said back wall, said instrument support having a pair of parallel sidewalls connected by a crossbar to form a trough open at the top, said sidewalls having mutually facing inside faces, each inside face having a plurality of channels which parallel said axis and allow insertion of at least one instrument support plate at selectable heights with said casing shell.

2. Protective casing as in claim 1 wherein said tubular casing shell has a pair of L-shaped ribs on said bottom and said casing support has a pair of opposed parallel side edges, said ribs forming a dovetail guide which slideably receives said side edges therebetween in a direction parallel to said axis and likewise permits slideably withdrawing said casing shell.

3. Protective casing as in claim 2 further comprising a first set of stop elements on said casing support toward said front end of said shell and a second said of stop elements on said rear end of said casing shell, said first and second sets of stop elements cooperating to permit pivoting of said casing shell relative to said support upon withdrawing said shell along said support.

4. Protective casing according to claim 1, wherein the casing support (9) has at least one axial canal (50) open on the top in relation to the casing shell (2) to accommodate wires so that they are covered from the outside.

5. Protective casing according to claim 4, wherein a longitudinal slot (16) located in the middle of the casing support (9) has an axial canal (50) on each of its sides.

6. Protective casing according to claim 4, wherein at least the one existing axial canal (50) has at least one opening facing down (51, 52) to pass wires through.

7. Protective casing according to claim 1, wherein the instrument support plate (39) has a slot (69) along its longest center axis.

8. Protective casing according to claim 1, wherein the instrument plate support (40) has an edged shape in its center portion forming two parallel walls (71), and has two opposite guide ribs (72) pointing outside on the free longitudinal edges of the side walls, which can be inserted in the opposite grooves (38) of the instrument support (11).

9. Protective casing according to claim 1, wherein the instrument support plate (39, 40) has a locking mechanism against torsion (70, 73) for the instrument.

10. Protective casing according to claim 1, wherein the instrument support (11) has an insertion guide (41) open on the top in the area of the crossbar (37), intended for the insertion of at least one support plate (24) for a heating element (25) to heat the casing window (26).

11. Protective casing according to claim 1, wherein the backwall (4) is in the shape of a casting, and has fastening elements for the instrument support (11) and the casing support (9) located on the front side (54) facing the casing shell (2).

12. Protective casing according to claim 11, wherein the backwall (4) has an inclosing wall (61) facing away from the casing shell (2), which in a vertical plane has an angled "V"-shape, forming a prism-shaped recession (64) open towards the outside and where the aperture angle of the "V" is 90 degrees, and both sides (62, 63) of the "V" run as an acute angle in relation to the casing axis A—A, and that the wall element which forms the upper side (62) of the "V" has at least one opening (65) for the introduction and insertion of electrical connections.

13. Protective casing according to claim 11 wherein the backwall (4) has a hollow space (55) facing the casing shell (2) which complements the hollow space of the casing shell (2), and which has grooves (56) and ribs (57) on its lateral boundary walls, which are in alignment with the grooves (38) and ribs of the instrument support (11).

14. Protective casing as in claim 1 further comprising a cover which fits over part of said back wall and includes a hollow space which forms a conduit for said electrical cable means.

15. Protective casing according to claim 1 wherein said casing shell further comprises a front wall and wherein the front wall (3) and the backwall (4) are castings which are in the area of the contact surfaces with the casing shell (2) have grooves (66, 67) contemplated for the insertion of gaskets which in cross-section "T"-shaped.

16. Protective casing according to claim 1 wherein said casing support (9) is rigidly connected to the backwall (4), and its length corresponds to that of the casing shell (2), so that a parallel walled gap is formed between the instrument support (11) and the casing support (9), through which the cross bar of the casing shell (2) can be withdrawn.

* * * * *

UNITED STATES PATENT AND TRADEMARK OFFICE
CERTIFICATE OF CORRECTION

PATENT NO. : 5,115,263
DATED : May 19, 1992
INVENTOR(S) : Bernhardt et al.

It is certified that error appears in the above-identified patent and that said Letters Patent is hereby corrected as shown below:

Column 3, line 54, after "Fig." insert --4--.

Column 6, line 57, after "casing shell" insert --2--.

Signed and Sealed this

Twenty-eighth Day of September, 1993

Attest:

BRUCE LEHMAN

Attesting Officer     Commissioner of Patents and Trademarks